US007755648B2

(12) United States Patent
Brown Elliott

(10) Patent No.: US 7,755,648 B2
(45) Date of Patent: Jul. 13, 2010

(54) COLOR FLAT PANEL DISPLAY SUB-PIXEL ARRANGEMENTS AND LAYOUTS

(75) Inventor: Candice Hellen Brown Elliott, Vallejo, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 683 days.

(21) Appl. No.: 11/182,308

(22) Filed: Jul. 14, 2005

(65) Prior Publication Data

US 2005/0264588 A1   Dec. 1, 2005

Related U.S. Application Data

(63) Continuation of application No. 10/024,326, filed on Dec. 14, 2001, now Pat. No. 6,950,115.

(60) Provisional application No. 60/290,103, filed on May 9, 2001.

(51) Int. Cl.
*G09G 5/10* (2006.01)
(52) U.S. Cl. .................. 345/690; 345/691; 345/92
(58) Field of Classification Search ......... 345/690–699, 345/92; 313/506
See application file for complete search history.

(56) References Cited

U.S. PATENT DOCUMENTS

| 3,971,065 | A | 7/1976 | Bayer .................... 358/41 |
| 4,353,062 | A | 10/1982 | Lorteije et al. |
| 4,593,978 | A | 6/1986 | Mourey et al. |
| 4,642,619 | A | 2/1987 | Togashi |
| 4,651,148 | A | 3/1987 | Takeda et al. |
| 4,751,535 | A | 6/1988 | Myers |
| 4,773,737 | A | 9/1988 | Yokono et al. |

(Continued)

FOREIGN PATENT DOCUMENTS

DE    199 23 527    11/2000

(Continued)

OTHER PUBLICATIONS

R. Martin et al., "Detectability of reduced blue pixel count in projection displays", Proceedings of the Society for Information Display Symposium Digest, pp. 606-609, May 1993.

*Primary Examiner*—Amare Mengistu
*Assistant Examiner*—Premal Patel
(74) *Attorney, Agent, or Firm*—Innovation Counsel LLP

(57) ABSTRACT

An array comprising a plurality of three-color pixel elements is disclosed. The three-color pixel element has square design disposed at the origin of an X, Y coordinate system. Disposed at the center of the square is a blue emitter. Red emitters are disposed in the second and fourth quadrants not occupied by the blue emitter and green emitters are disposed in the first and third quadrants not occupied by the blue emitter. The blue emitter is square shaped, having corners aligned at the X and Y axes of the coordinate system, and the opposing pairs of red and green emitters are generally square shaped, having truncated inwardly-facing corners forming edges parallel to the sides of the blue emitter. The plurality of three-color pixel elements may be arranged in rows and columns to form a display. Each emitter has a transistor. The column lines and row lines are doubled to allow for the transistors of the red emitters and green emitters to be gathered together into the interstitial corners between the three-color pixel elements creating combined transistor groups. With the transistors grouped together, the combined transistors groups and the blue emitters both become less visible, virtually vanishing from sight almost entirely.

14 Claims, 5 Drawing Sheets

U.S. PATENT DOCUMENTS

| | | | |
|---|---|---|---|
| 4,786,964 A | 11/1988 | Plummer et al. | 358/44 |
| 4,792,728 A | 12/1988 | Chang et al. | |
| 4,800,375 A | 1/1989 | Silverstein et al. | |
| 4,853,592 A | 8/1989 | Strathman | |
| 4,874,986 A | 10/1989 | Menn et al. | |
| 4,886,343 A | 12/1989 | Johnson | 350/335 |
| 4,908,609 A | 3/1990 | Stroomer | |
| 4,920,409 A | 4/1990 | Yamagishi | 358/56 |
| 4,965,565 A | 10/1990 | Noguchi | |
| 4,966,441 A | 10/1990 | Conner | |
| 4,967,264 A | 10/1990 | Parulski | 358/44 |
| 5,006,840 A | 4/1991 | Hamada et al. | |
| 5,052,785 A | 10/1991 | Takimoto et al. | |
| 5,113,274 A | 5/1992 | Takahashi et al. | 359/333 |
| 5,132,674 A | 7/1992 | Bottorf | |
| 5,144,288 A | 9/1992 | Hamada et al. | |
| 5,233,385 A | 8/1993 | Sampsell | |
| 5,311,337 A | 5/1994 | McCartney, Jr. | |
| 5,315,418 A | 5/1994 | Sprague | 359/40 |
| 5,334,996 A | 8/1994 | Tanigaki et al. | 345/152 |
| 5,341,153 A | 8/1994 | Benzschawel | 345/152 |
| 5,398,066 A | 3/1995 | Martinez-Uriegas et al. | 348/393 |
| 5,436,747 A | 7/1995 | Suzuki | |
| 5,461,503 A | 10/1995 | Deffontaines et al. | |
| 5,485,293 A | 1/1996 | Robinder | |
| 5,535,028 A | 7/1996 | Bae et al. | |
| 5,541,653 A | 7/1996 | Peters et al. | 348/264 |
| 5,559,905 A | 9/1996 | Greggain et al. | |
| 5,561,460 A | 10/1996 | Katoh et al. | 348/219 |
| 5,563,621 A | 10/1996 | Silsby | |
| 5,579,027 A | 11/1996 | Sakurai et al. | |
| 5,646,702 A | 7/1997 | Akinwande et al. | |
| 5,648,793 A | 7/1997 | Chen | 345/96 |
| 5,739,802 A | 4/1998 | Mosier | |
| 5,754,226 A | 5/1998 | Yamada et al. | 348/219 |
| 5,767,837 A | 6/1998 | Hara | |
| 5,792,579 A | 8/1998 | Phillips | |
| 5,815,101 A | 9/1998 | Fonte | |
| 5,821,913 A | 10/1998 | Mamiya | |
| 5,854,616 A * | 12/1998 | Ota et al. | 345/100 |
| 5,949,496 A | 9/1999 | Kim | |
| 5,973,664 A | 10/1999 | Badger | |
| 6,002,446 A | 12/1999 | Eglit | |
| 6,008,868 A | 12/1999 | Silverbrook | 348/790 |
| 6,011,531 A * | 1/2000 | Mei et al. | 345/92 |
| 6,034,666 A | 3/2000 | Kanai et al. | |
| 6,037,719 A * | 3/2000 | Yap et al. | 315/169.3 |
| 6,038,031 A | 3/2000 | Murphy | |
| 6,049,626 A | 4/2000 | Kim | |
| 6,061,533 A | 5/2000 | Kajiwara | |
| 6,064,363 A | 5/2000 | Kwon | 345/98 |
| 6,097,367 A | 8/2000 | Kuriwaki et al. | |
| 6,108,122 A | 8/2000 | Ulrich et al. | |
| 6,144,352 A | 11/2000 | Matsuda et al. | |
| 6,147,664 A | 11/2000 | Hansen | |
| 6,160,535 A | 12/2000 | Park | 345/153 |
| 6,184,853 B1 | 2/2001 | Hebiguchi et al. | |
| 6,184,903 B1 | 2/2001 | Omori | |
| 6,188,385 B1 | 2/2001 | Hill et al. | 345/136 |
| 6,198,507 B1 | 3/2001 | Ishigami | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,243,055 B1 | 6/2001 | Fergason | |
| 6,243,070 B1 | 6/2001 | Hill et al. | |
| 6,271,891 B1 | 8/2001 | Ogawa et al. | |
| 6,299,329 B1 | 10/2001 | Mui et al. | |
| 6,326,981 B1 | 12/2001 | Mori et al. | |
| 6,327,008 B1 | 12/2001 | Fujiyoshi | |
| 6,332,030 B1 | 12/2001 | Manjunath | |
| 6,335,719 B1 | 1/2002 | An et al. | |
| 6,339,434 B1 | 1/2002 | West et al. | |
| 6,348,929 B1 | 2/2002 | Acharya | |
| 6,360,023 B1 | 3/2002 | Betrisey et al. | |
| 6,377,262 B1 | 4/2002 | Hitchcock et al. | |
| 6,392,717 B1 | 5/2002 | Kunzman | |
| 6,393,145 B2 | 5/2002 | Betrisey et al. | |
| 6,396,505 B1 | 5/2002 | Lui | |
| 6,441,867 B1 | 8/2002 | Daly | |
| 6,453,067 B1 | 9/2002 | Morgan et al. | |
| 6,466,618 B1 | 10/2002 | Messing et al. | |
| 6,486,923 B1 | 11/2002 | Maeshima et al. | |
| 6,542,161 B1 | 4/2003 | Koyama et al. | |
| 6,545,653 B1 | 4/2003 | Takahara | |
| 6,570,584 B1 | 5/2003 | Cok et al. | |
| 6,590,555 B2 | 7/2003 | Su et al. | |
| 6,597,411 B1 | 7/2003 | Selby et al. | |
| 6,661,429 B1 | 12/2003 | Phan | |
| 6,674,430 B1 | 1/2004 | Kaufman | |
| 6,714,206 B1 * | 3/2004 | Martin et al. | 345/589 |
| 6,738,204 B1 | 5/2004 | Chuang et al. | |
| 6,750,875 B1 | 6/2004 | Keely, Jr. | |
| 6,804,407 B2 | 10/2004 | Weldy | |
| 2001/0017515 A1 | 8/2001 | Kusunoki et al. | |
| 2001/0017607 A1 | 8/2001 | Kwon et al. | |
| 2001/0040645 A1 | 11/2001 | Yamazaki | |
| 2002/0011785 A1 * | 1/2002 | Tang et al. | 313/506 |
| 2002/0012071 A1 | 1/2002 | Sun | |
| 2002/0015110 A1 | 2/2002 | Brown Elliott | |
| 2002/0017645 A1 | 2/2002 | Yamazaki et al. | |
| 2002/0067328 A1 * | 6/2002 | Yumoto et al. | 345/92 |
| 2002/0122160 A1 | 9/2002 | Kunzman | |
| 2002/0140831 A1 | 10/2002 | Hayashi | |
| 2002/0190648 A1 | 12/2002 | Bechtel et al. | |
| 2003/0006978 A1 | 1/2003 | Fujiyoshi | |
| 2003/0011603 A1 | 1/2003 | Koyama | |
| 2003/0011613 A1 | 1/2003 | Booth, Jr. | |
| 2003/0043567 A1 | 3/2003 | Hoelen et al. | |
| 2003/0071826 A1 | 4/2003 | Goertzen | |
| 2003/0071943 A1 | 4/2003 | Choo et al. | |
| 2003/0077000 A1 | 4/2003 | Blinn | |
| 2003/0218618 A1 | 11/2003 | Phan | |
| 2004/0213449 A1 | 10/2004 | Safee-Rad | |
| 2004/0247070 A1 | 12/2004 | Ali | |

FOREIGN PATENT DOCUMENTS

| | | |
|---|---|---|
| DE | 199 23 527 A1 | 11/2000 |
| EP | 1 381 020 | 1/2004 |
| GB | 2 133 912 A | 8/1984 |
| WO | WO 00/65432 | 11/2000 |

* cited by examiner

_US 7,755,648 B2_

COLOR FLAT PANEL DISPLAY SUB-PIXEL ARRANGEMENTS AND LAYOUTS

RELATED APPLICATIONS

The present application is a continuation of parent U.S. patent application Ser. No. 10/024,326 (US Publication No. 2004/0046714), filed Dec. 14, 2001 and claiming benefit of grandparent US Provisional 60/290,103 filed May 9, 2001, where said parent has issued as U.S. Pat. No. 6,950,115 and the present application incorporates by reference the disclosures of said parent and grandparent applications and claims benefit of their filing dates.

BACKGROUND

The present application relates to improvements to display layouts, and specifically to improved color pixel arrangements and means of addressing used in displays.

The present state of the art of color single plane imaging matrix, for flat panel displays use the red-green-blue (RGB) color triad or a single color in a vertical stripe as shown in prior art FIG. 1. Prior art FIG. 1 shows an arrangement 10 having several three-color pixel elements with red emitters (or sub-pixels) 14, blue emitters 16, and green emitters 12. The arrangement takes advantage of the Von Bezold effect by separating the three colors and placing equal spatial frequency weight on each color. However, this panel suffers because of inadequate attention to how human vision operates. These types of panels are a poor match to human vision.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. It is "color blind". It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. The blue receptor contribution to luminance perception is negligible. The luminance channel acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the diagonal axes is significantly lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the blue resolution by one octave will be barely noticeable by the most perceptive viewer, if at all, as experiments at Xerox and NASA, Ames Research Center (R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.250 subtends 50 mils (1,270μ) on a display. Thus, if the blue pixel pitch is less than half (625μ) of this blending pitch, the colors will blend without loss of picture quality. This blending effect is directly related to the chromanance sub-channel resolution limits described above. Below the resolution limit, one sees separate colors, above the resolution limit, one sees the combined color.

Examining the conventional RGB stripe display in prior art FIG. 1, the design assumes that all three colors have the same resolution. The design also assumes that the luminance information and the chromanance information have the same spatial resolution. Further, keeping in mind that the blue sub-pixel is not perceived by the human luminance channel and is therefore seen as a black dot, and since the blue sub-pixel is aligned in stripes, the human viewer sees vertical black lines on the screen as shown in FIG. 2. The image displayed has large areas of white space, such as when displaying black text on a white background. These stripes are viewed as a distracting screen artifact. Typical higher resolution prior art displays have pixel densities of 90 pixels per inch. At an average viewing distance of 18 inches, this represents approximately 28 pixels per degree or approximately 14 cycles/°, when showing lines and spaces at the highest Modulation Transfer Function (MTF) allowed by the display. However, what the luminance channel sees is an approximately 28 cycles/° signal horizontally across a white image when considering that the blue sub-pixel 12 is dark compared to the red 14 and green 16 emitters, as shown in prior art FIG. 2. This 28 cycles/° artifact is closer to the peak luminance channel response spatial frequency, 35 cycles/°, than the desired image signal, 14 cycles/°, thus competing for the viewer's attention.

Thus, the prior art arrangement of three-color emitters is shown to be a poor match to human vision.

SUMMARY

A system of addressing an array of color pixels for a flat panel display is disclosed. More particularly, the layout of column and row drive lines and transistors of three-color pixel element of spaced-apart emitters is disclosed.

The three-color pixel element has square design disposed at the origin of an X, Y coordinate system. Disposed at the center of the square is a blue emitter. Red emitters are disposed in the second and fourth quadrants not occupied by the blue emitter and green emitters are disposed in the first and third quadrants not occupied by the blue emitter. The blue emitter is square shaped, having corners aligned at the X and Y axes of the coordinate system, and the opposing pairs of red and green emitters are generally square shaped, having truncated inwardly-facing corners forming edges parallel to the sides of the blue emitter. The plurality of three-color pixel elements may be arranged in rows and columns to form a display. This array provides better perceived resolution and appearance of single full color displays by matching the human vision system.

Each emitter has a transistor and associated components or structures, such as capacitors. The column lines and row lines are doubled to allow for the transistors and associated structures of the red emitters and green emitters to be gathered together at the interstitial corners between the three-color pixel elements creating combined transistor groups. With the transistors grouped together, the combined transistors groups and the blue emitters both become less visible at 56 cycles/.degree., virtually vanishing from sight almost entirely.

BRIEF DESCRIPTION OF THE DRAWINGS

Referring now to the figures, wherein like elements are numbered alike.

DETAILED DESCRIPTION

Those of ordinary skill in the art will realize that the following is illustrative only and not in any way limiting. Other embodiments will readily suggest themselves to such skilled persons.

Figure 3:
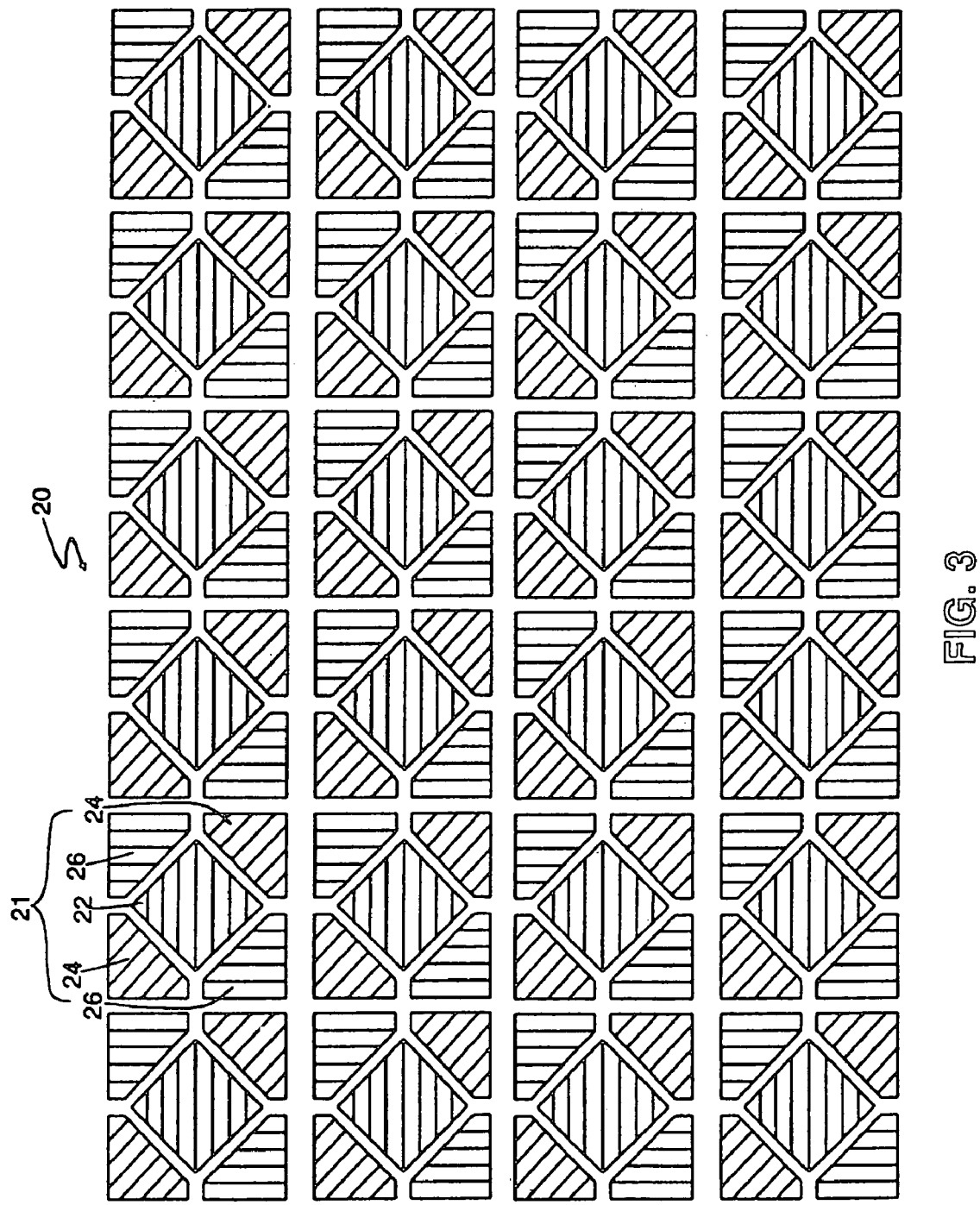
FIG. 3 illustrates an arrangement of three-color pixel elements in an array, in a single plane, for a display device.

FIG. 3 illustrates an arrangement 20 of several three-color pixel elements according to a preferred embodiment. A three-color pixel element 21 consists of a blue emitter (or sub-pixel) 22, two red emitters 24, and two green emitters 26 in a square, which is described as follows. The three-color pixel element 21 is square shaped and is centered at the origin of an X, Y coordinate system. The blue emitter 22 is centered at the origin of the square and extends into the first, second, third, and fourth quadrants of the X, Y coordinate system. A pair of red emitters 24 are disposed in opposing quadrants (i.e., the second and the fourth quadrants), and a pair of green emitters 26 are disposed in opposing quadrants (i.e., the first and the third quadrants), occupying the portions of the quadrants not occupied by the blue emitter 22. As shown in FIG. 3, the blue emitter 22 can be square-shaped, having corners aligned at the X and Y axes of the coordinate system, and the opposing pairs of red 24 and green 26 emitters can be generally square shaped, having truncated inwardly-facing corners forming edges parallel to the sides of the blue emitter 22.

The array is repeated across a panel to complete a device with a desired matrix resolution. The repeating three-color pixels form a "checker board" of alternating red 24 and green 26 emitters with blue emitters 22 distributed evenly across the device. However, the blue emitters 22 are at half the resolution of the red 24 and green 26 emitters.

One advantage of the three-color pixel element array is improved resolution of color displays. This occurs since only the red and green emitters contribute significantly to the perception of high resolution in the luminance channel. Thus, reducing the number of blue emitters and replacing some with red and green emitters improves resolution by more closely matching human vision.

Dividing the red and green emitters in half in the vertical axis to increase spatial addressability is an improvement over the conventional vertical single color stripe of the prior art. An alternating "checkerboard" of red and green emitters allows the Modulation Transfer Function (MTF), high spatial frequency resolution, to increase in both the horizontal and the vertical axes. A further advantage of this arrangement over prior art is the shape and location of the blue emitter.

Figure 1:
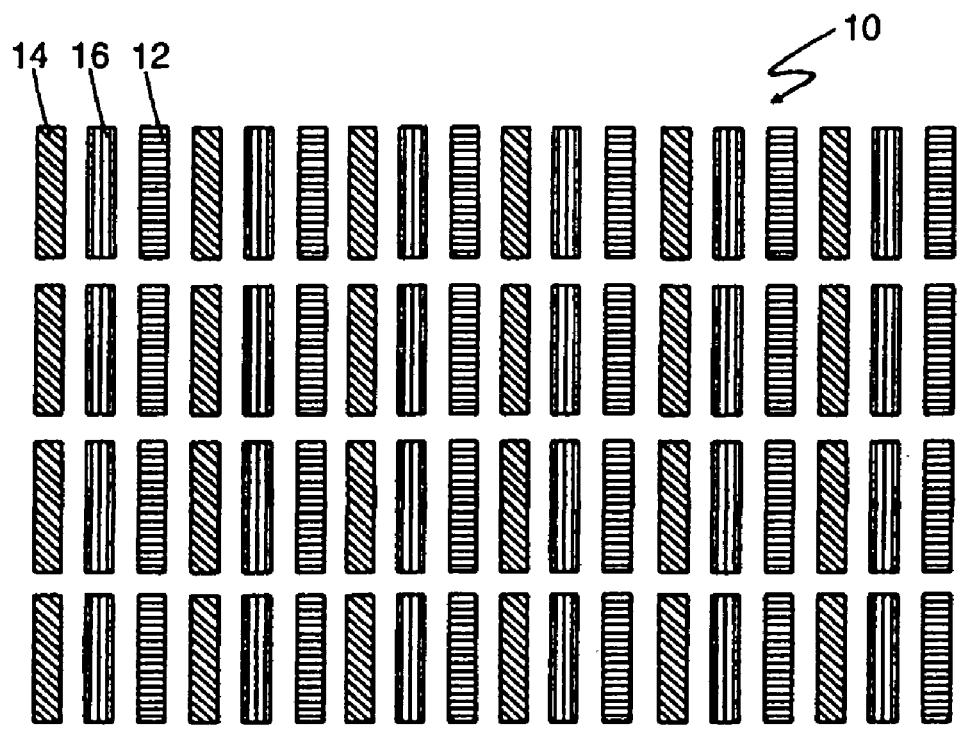
FIG. 1 illustrates a prior art RGB stripe arrangement of three-color pixel elements in an array, a single plane, for a display device.
Figure 2:
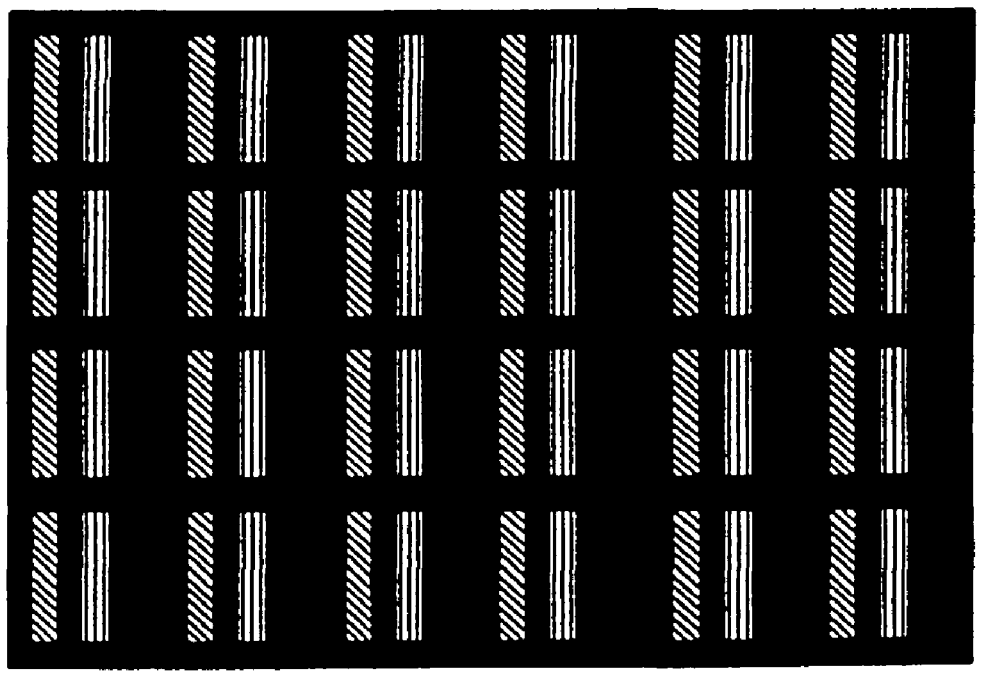
FIG. 2 illustrates a prior art RGB stripe arrangement as it would be perceived by the luminance channel of the human vision system when a full white image is displayed.
Figure 4:
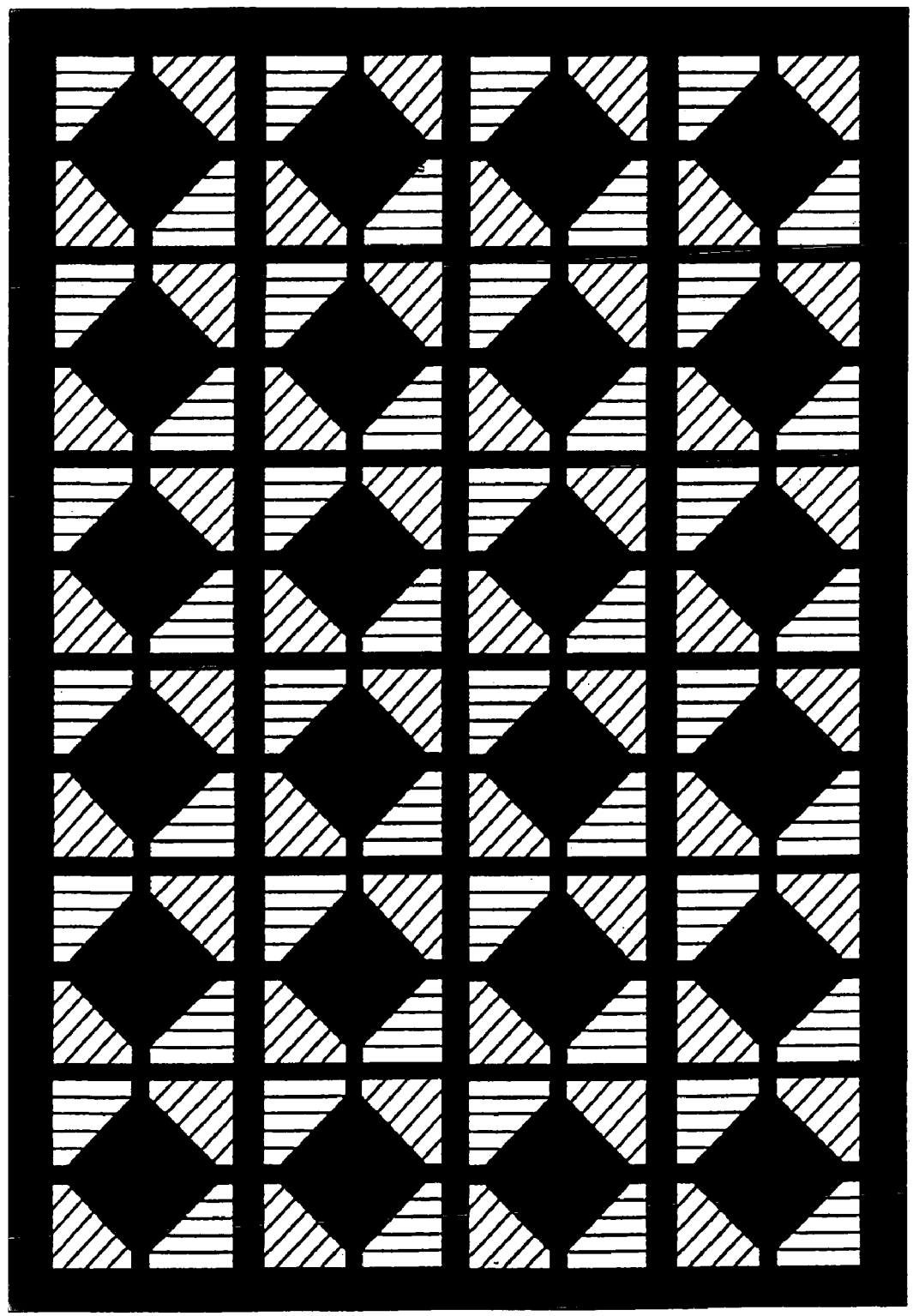
FIG. 4 illustrates the arrangement of FIG. 3, as the luminance channel of the human vision system would perceive it when a full white image is displayed.

In the prior art arrangement of FIG. 1, the blue emitters are in stripes. When viewed, the luminance channel of the human vision system sees these blue emitters as black stripes alternating with white stripes, as illustrated in prior art FIG. 2. In the horizontal direction, there are faint, but discernable lines between rows of three-color pixel elements, largely due to the presence of the transistors, and/or associated structures, such as capacitors, at each emitter, as is common in the art. However, with the arrangement of FIG. 3, when viewed, the luminance channel of the human vision system sees black dots alternating with white dots as illustrated in FIG. 4. This is an improvement because the spatial frequency, Fourier Transform wave component, energy is now spread into every axis, vertical, diagonal, as well as horizontal, reducing the amplitude of the original horizontal signal, and thus, the visual response (i.e., visibility).

Figure 5:
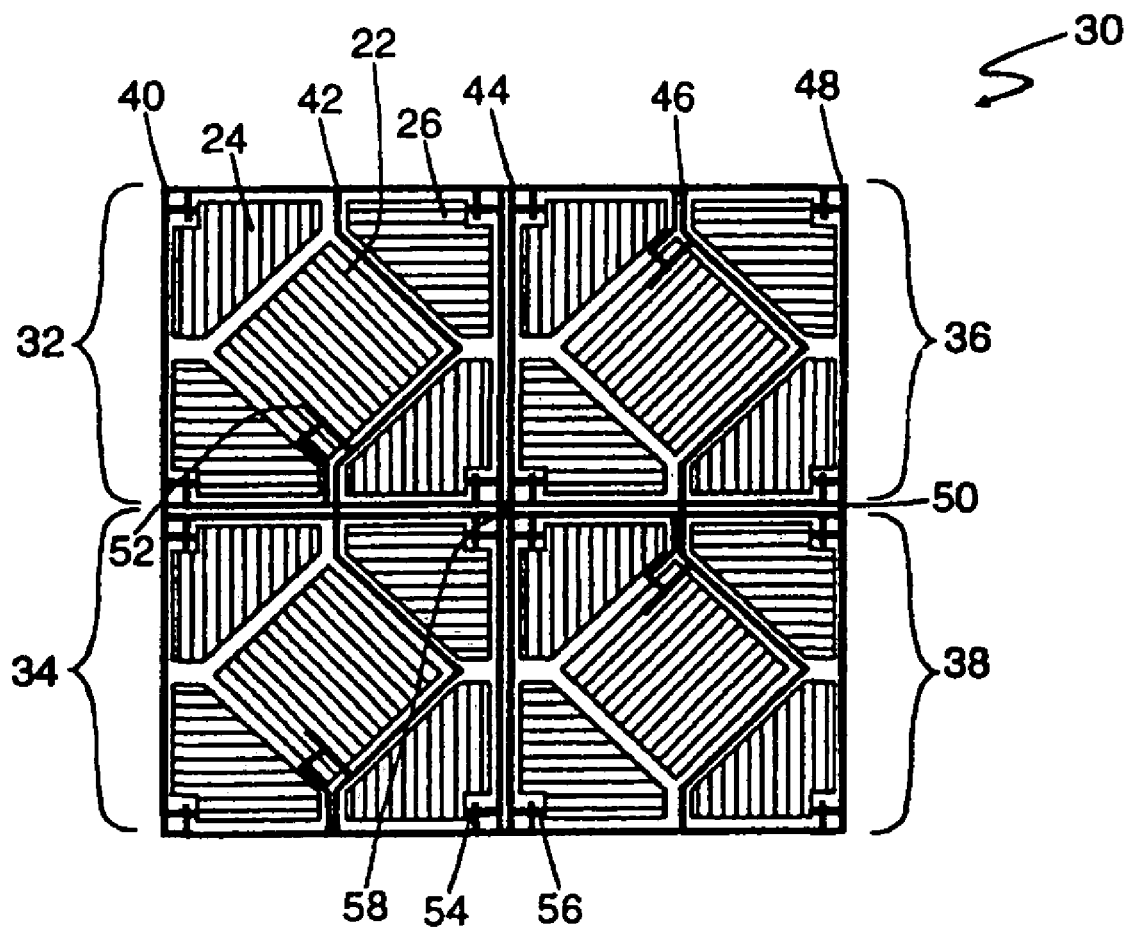
FIG. 5 illustrates a layout of drive lines and transistors for the arrangement of pixel elements of FIG. 4.

FIG. 5 illustrates a preferred embodiment wherein only four three-color pixel elements 32, 34, 36, and 38 are grouped in arrangement 30, while several thousand can be arranged in an array. Column address drive lines 40, 42, 44, 46, and 48 and row address drive line 50 drive each three color pixel element 32, 34, 36, and 38. Each emitter has a transistor, and possibly associated structures such as a capacitor, which may be a sample/hold transistor/capacitor circuit. Therefore, each blue emitter 22 has a transistor 52, each red emitter 24 has a transistor 54, and each green emitter 26 has a transistor 56. Having two column lines 44 and two row lines 50 allows for the transistors, and/or associated structures, for the red emitters and green emitters to be gathered together into the interstitial corners between the three-color pixel elements 32, 34, 36, and 38 creating combined transistor groups 58.

Figure 6:
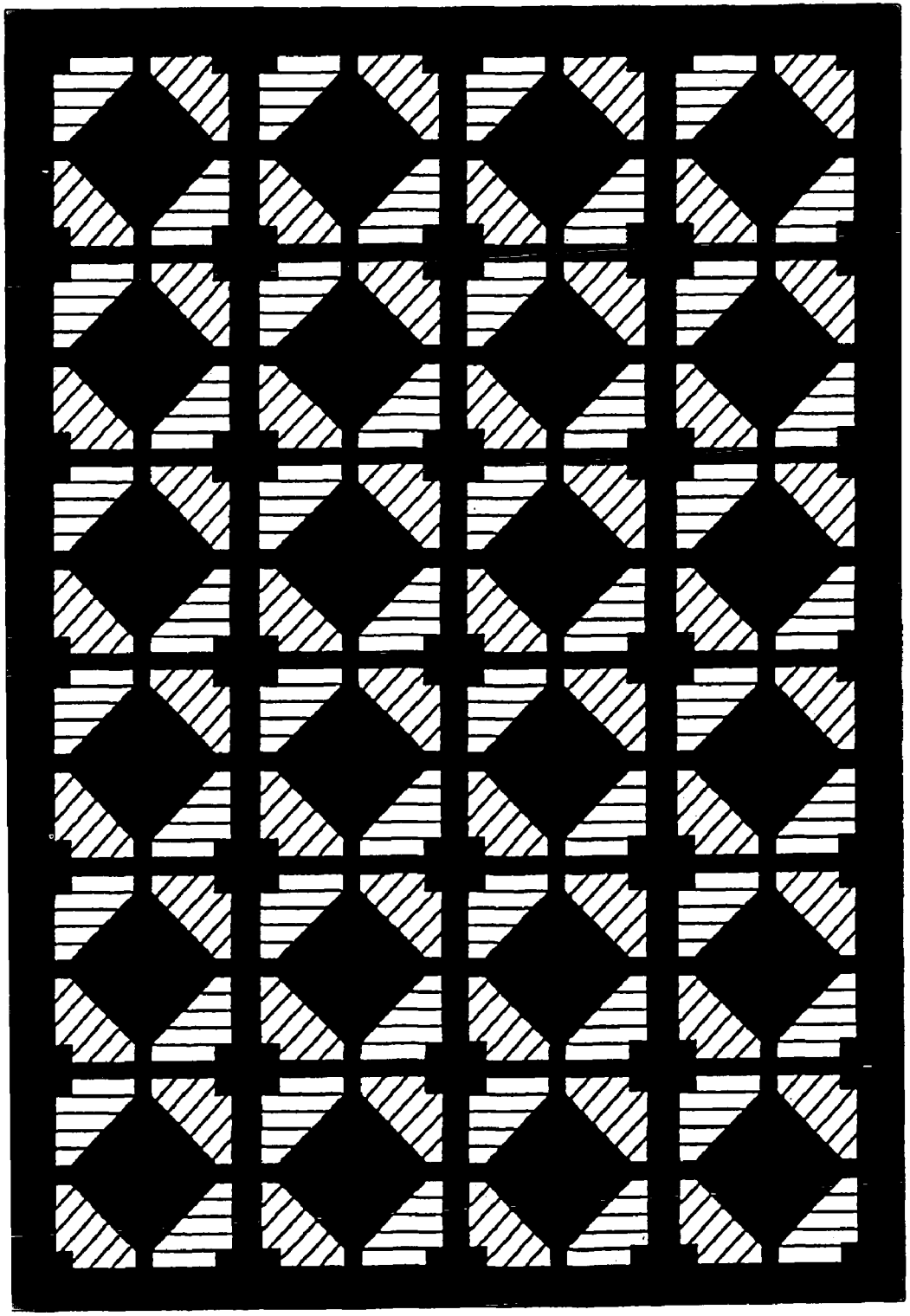
FIG. 6 illustrates the arrangement of FIG. 5, as it would be perceived by the luminance channel of the human vision system, prior to filtering, when a full white image is displayed.

The grouping of the transistors and/or associated structures, such as capacitors, in the interstitial corners appears to be counter to good design practice, as understood in the prior art, since collecting them together makes them a bigger, and thus more visible dark spot, as shown in FIG. 6. However, in this circumstance these dark spots are exactly halfway between the blue emitter 22 in each three-color pixel element.

In this embodiment, the spatial frequency of the combined transistor groups and/or associated structures, 58 and the blue emitter 22 is doubled, pushing them above the 50 cycles/.degree. resolution limit of the luminance channel of human vision. For example, in a 90 pixel per inch display panel the blue emitter pitch, without the grouped transistors, would create a 28 cycles/.degree. luminance channel signal, both horizontally and vertically. In other words, the blue emitters may be visible as a texture on solid white areas of a display. However, they will not be as visible as the stripes visible in the prior art.

In contrast, with the transistors grouped together, the combined group transistors 58 and the blue emitters 22 both become less visible at 56 cycles/.degree., virtually vanishing from sight almost entirely. In other words, the grouping of the transistors and the blue emitters combine to produce a texture on solid white areas of a display too fine for the human visual system to see. In using this embodiment, the solid white areas become as smooth looking as a sheet of paper.

The grouping of the transistors, and/or associated structures, and placement of the blue emitters work together to match to human vision. In contrast to the prior art, which creates black lines with the placement of the blue emitters and transistor, the arrangement of the present invention removes this problem. In placing the transistors in accordance with the above arrangements, the transistors and blue emitters vanish from sight almost entirely providing a smooth looking display without a visible texture.

While the invention has been described with reference to exemplary embodiments, it will be understood by those skilled in the art after reading the present disclosure that various changes may be made and equivalents may be substituted for elements described herein without departing from the scope and spirit of the described invention. In addition, many modifications may be made to adapt to a particular situation or use a particular material while maintaining consonance with the present teachings. Therefore, it is intended that the present disclosure of invention not be limited to the particular embodiments disclosed herein but rather that the present disclosure of invention be given broad reasonable interpretation.

What is claimed is:

1. A display comprising:
   a display surface tiled by a repeating subpixel repeating group, said repeating group comprising a selectively activatable blue subpixel, and at least a differently colored and independently selectively activatable second subpixel and a differently colored and independently selectively activatable third subpixel;
   wherein said blue subpixels, said second colored subpixels and said third colored subpixels are respectively operatively coupled to associated subpixel drive structures which independently drive the respective subpixels when selectively activating the respective subpixels;
   wherein said associated subpixel drive structures of the second and third subpixels are positionally clustered together at interstitial areas between said subpixel repeating groups such that said positionally clustered associated structures of the second and third subpixels form first luminance dark spot regions dispersed across the display surface and between the blue subpixels such that perception of second luminance dark spot regions defined by distribution of said blue subpixels and by distribution of the respective subpixel drive structures associated with the blue subpixels upon said display surface is decreased for a human viewer due to interspersing of the first luminance dark spot regions among the second luminance dark spot regions.

2. The display of claim 1 wherein said second colored subpixels are red subpixels and said third colored subpixels are green subpixels; and
   wherein in each subpixel repeating group there are plural independently activatable red subpixels and plural independently activatable green subpixels and said red subpixels and said green subpixels define substantially a checkerboard pattern within each said repeating group.

3. The display of claim 1 wherein said associated structures include transistors.

4. The display of claim 1 wherein said associated structures include capacitors.

5. A color display for displaying color images, the display comprising:
   a plurality of substantially identical pixel units tiled across a face of the display,
      where each pixel unit includes a first plurality of independently drivable first subpixel elements that can primarily emit light of a first wavelength,
      where each pixel unit includes a second plurality of independently drivable second subpixel elements that can primarily emit light of a second wavelength,
      where each pixel unit includes an independently drivable third subpixel element that can primarily emit light of a third wavelength,
      said third wavelength being shorter than the second wavelength and said second wavelength being shorter than the first wavelength;
   wherein said third subpixel elements are uniformly spaced apart from each other across the face of the display, and
   wherein each of said independently drivable first and second subpixel elements has a respective subelement drive structure operatively coupled thereto for independently driving that subpixel element and the subelement drive structures of more than two adjacent ones of the first and second subpixel elements are positionally clustered together to thereby form first luminance dark spot regions dispersed across the display face and dispersed between the third subpixel elements.

6. The color display of claim 5 wherein said third subpixel elements primarily emit a blue light.

7. The color display of claim 5 wherein said first subpixel elements primarily emit a red light.

8. The color display of claim 5 wherein said second subpixel elements primarily emit a green light.

9. The color display of claim 8 wherein said third subpixel elements primarily emit a blue light.

10. A method of uniformly distributing luminance dark spots across a face of a color display, the method comprising:
    providing a plurality of substantially identical pixel units tiled across the face of the display,
       where each pixel unit includes a first plurality of independently drivable first subpixel elements that can primarily emit light of a first wavelength,
       where each pixel unit includes a second plurality of independently drivable second subpixel elements that can primarily emit light of a second wavelength,
       where each pixel unit includes an independently drivable third subpixel element that can primarily emit light of a third wavelength,
       said third wavelength being shorter than the second wavelength and said second wavelength being shorter than the first wavelength;
    spacing apart said third subpixel elements uniformly from each other across the face of the display, and
    providing each of said independently drivable first and second subpixel elements with a respective subelement drive structure that operatively coupled thereto for independently driving that subpixel element, where said providing of the subelement drive structures includes positionally clustering together the subelement drive structures of more than two adjacent ones of the first and second subpixel elements to thereby form first luminance dark spot regions dispersed across the display face and dispersed between the third subpixel elements.

11. The method of claim 10 wherein said third subpixel elements primarily emit a blue light.

12. The method of claim 10 wherein said first subpixel elements primarily emit a red light.

13. The method of claim 10 wherein said second subpixel elements primarily emit a green light.

14. The method of claim 13 wherein said third subpixel elements primarily emit a blue light.

* * * * *